United States Patent
Berendsen et al.

(10) Patent No.: US 9,943,028 B2
(45) Date of Patent: Apr. 17, 2018

(54) DOUBLE-DISC PLOUGHSHARE COMPRISING AN INNER-LYING DEPTH GUIDE WHEEL

(71) Applicant: LEMKEN GmbH & Co. KG, Alpen (DE)

(72) Inventors: Mark Berendsen, Lengel (NL); Dennis Bergerfurth, Rees (DE); Martin Gebbeken, Alpen (DE); Marcel Geraats, Nettetal (DE); Christian Gotzen, Viersen (DE); Thomas Lukas, Ahaus-Wuellen (DE); Christian Paessens, Issum (DE); Dieter Werries, Alpen (DE)

(73) Assignee: LEMKEN GMBH & CO. KG (DE)

( * ) Notice: Subject to any disclaimer, the term of this patent is extended or adjusted under 35 U.S.C. 154(b) by 0 days.

(21) Appl. No.: 15/030,009

(22) PCT Filed: Oct. 15, 2014

(86) PCT No.: PCT/DE2014/100368
§ 371 (c)(1),
(2) Date: Apr. 15, 2016

(87) PCT Pub. No.: WO2015/055181
PCT Pub. Date: Apr. 23, 2015

(65) Prior Publication Data
US 2016/0286714 A1 Oct. 6, 2016

(30) Foreign Application Priority Data
Oct. 15, 2013 (DE) .......................... 10 2013 111 355

(51) Int. Cl.
*A01B 49/02* (2006.01)
*A01B 49/04* (2006.01)
*A01B 49/06* (2006.01)
*A01C 5/06* (2006.01)
*A01C 7/20* (2006.01)
(Continued)

(52) U.S. Cl.
CPC ................ *A01C 5/064* (2013.01); *A01B 5/04* (2013.01); *A01B 15/18* (2013.01); *A01B 49/027* (2013.01); *A01B 49/04* (2013.01); *A01B 49/06* (2013.01); *A01C 7/203* (2013.01); *A01C 5/068* (2013.01)

(58) Field of Classification Search
CPC combination set(s) only.
See application file for complete search history.

(56) References Cited

U.S. PATENT DOCUMENTS

| | | | |
|---|---|---|---|
| 7,644,670 B2 * | 1/2010 | Martin | .................. A01O 5/064 111/163 |
| 2014/0090585 A1 * | 4/2014 | Sauder | .................. A01O 5/064 111/121 |

FOREIGN PATENT DOCUMENTS

| | | |
|---|---|---|
| CN | 201947635 U | 8/2011 |
| DE | 19731862 A1 | 1/1999 |
| DE | 102007036662 A1 | 2/2009 |

(Continued)

*Primary Examiner* — Alicia Torres
(74) *Attorney, Agent, or Firm* — HM Law Group LLP; Vani Moodley, Esq.

(57) ABSTRACT

In each case at least one double disc coulter 7, 8 and one depth control wheel 9 areas arranged on the frame 6 of a pneumatic precision seed drill. Seen from the direction of travel, this depth control wheel 9 is located between the two disc coulters 7, 8, whereby the two disc coulters 7, 8 and the depth control wheel 9 rotate in the same direction.

18 Claims, 5 Drawing Sheets

Figure 1:
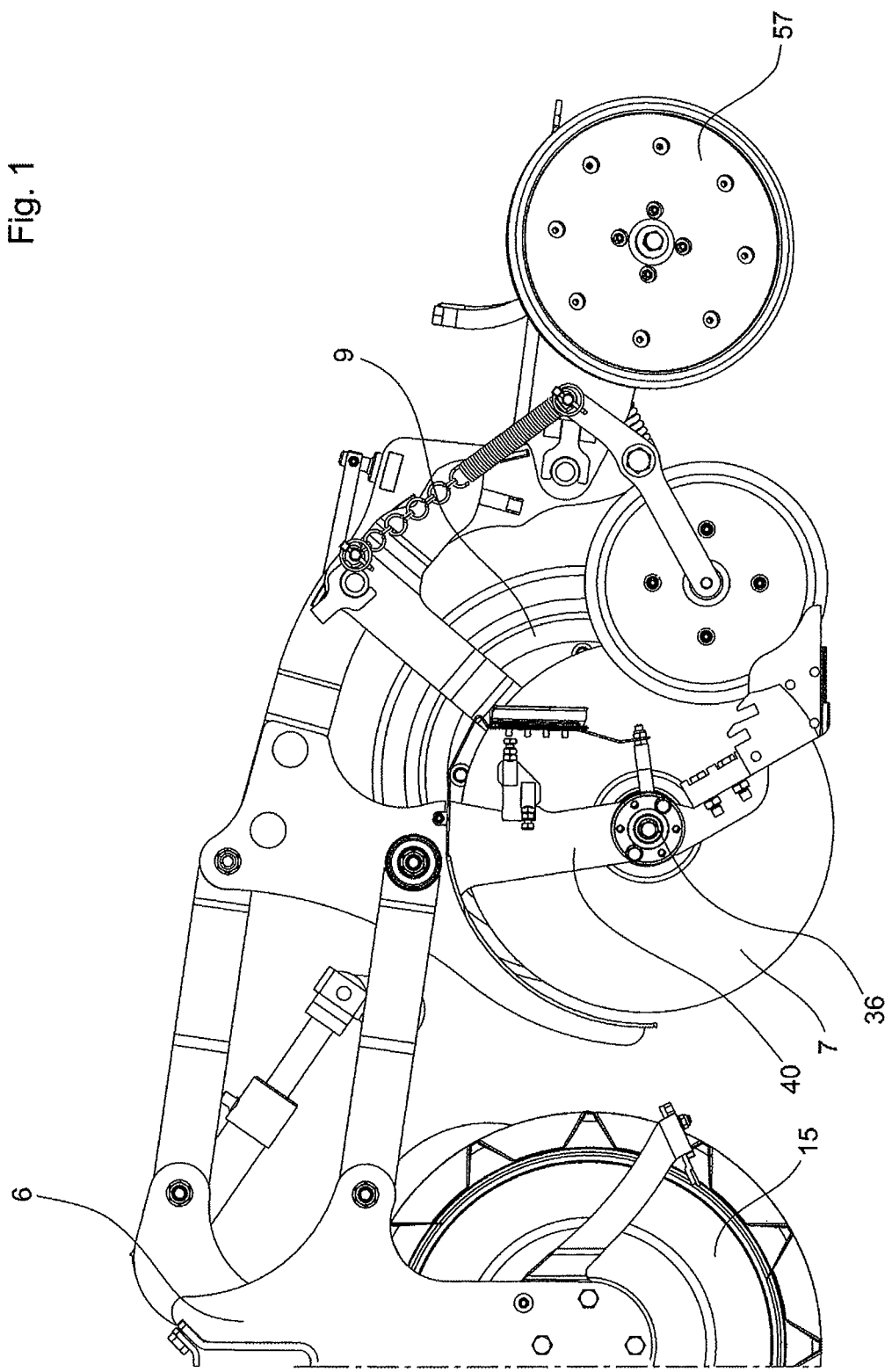

(51) Int. Cl.
*A01B 5/04* (2006.01)
*A01B 15/18* (2006.01)

(56) References Cited

FOREIGN PATENT DOCUMENTS

| DE | 102008045132 A1 * | 3/2010 | ............. A01C 5/064 |
|----|----|----|----|
| DE | 102008045132 | 5/2013 | |
| EP | 2022307 B1 | 5/2008 | |
| EP | 2554037 A1 | 2/2013 | |
| EP | 1911339 | 6/2014 | |

* cited by examiner

DOUBLE-DISC PLOUGHSHARE COMPRISING AN INNER-LYING DEPTH GUIDE WHEEL

The invention concerns an arrangement of coulters on the frame of an agricultural machine, preferably the arrangement of two double disc coulters and a depth guide roller on the frame of a seed drill preferably a pneumatic precision seed drill.

Pneumatic precision seed drills are used in agriculture in order to be able to plant seeds in the ground individually and at even distances. A double disc coulter arrangement is familiar from DE 10 2007 011 297, in which a subassembly mounted separately on the machine frame runs after the double disc coulters. This subassembly comprises a depth control wheel and two pressure rollers positioned opposite the depth control wheel to the rear and on each side of the depth control wheel. The pressure rollers are mounted together with the depth control wheel on the machine frame. The double disc coulters and the depth control wheel turn against each other, which means that the coulters push the soil to the inside, which leads inevitably to blockages and an unwanted braking effect.

The present invention is therefore faced with the task of creating an arrangement of coulters on the frame of an agricultural machine, preferably a precision seed drill, that largely prevents blockages between the double disc coulters and the depth control wheel and the accompanying braking effects.

This task is solved in accordance with the invention in that the depth control wheel, seen from the direction of travel, is located between the two double disc coulters, whereby the two double disc coulters and the depth control wheel rotate in the same direction and the depth control wheel and the two adjacent double disc coulters are arranged or designed so that they are at least approximately almost in contact.

The focus of the invention is therefore a unit in the form of two sowing coulters designed as double disc coulters with a depth control wheel positioned between them. The latter is still mounted in the front between the two double disc coulters and rotates in the same direction. This arrangement supports the earth being thrown to the side, prevents to the greatest extent earth being thrown into the middle and in this way practically rules out blockages. A supplementary suggestion provides for the depth control wheel and the two adjacent double disc coulters to be arranged or designed at least almost in contact in order to achieve the above-mentioned effects in an improved form.

If the depth control wheel and the inside coulters of the two adjacent double disc coulters are arranged or designed at least almost in contact at the front end of the depth control wheel, this has above all the advantage that with even running of the coulters and the depth control wheel in the same direction there may be a mutual drive of the coulters and the depth control wheel.

A further embodiment with a particularly favourable angle position of the invention provides that the clearance angle between depth control wheel and double disc coulter is 0.5° to 5.0°.

This arrangement is particularly advantageous if the axle of the double disc coulters and the axle of the depth control wheel seen from the direction of travel are at least approximately level, therefore positioned maximum to a slight extent offset from one another.

In order to guarantee that the double disc coulter and the depth control wheel actually rotate in the same direction making use of the above-mentioned advantages, it is provided that the axle of the double disc coulter lies within the circumference of the depth control wheel, thus guaranteeing equal guidance.

Alternatively, the axle of the depth control wheel lies within the circumference of the depth control wheel, in order to guarantee the above-mentioned likely guidance.

A further measure provides that the double disc coulter pairs are arranged at a slant to the direction of travel, in order to prevent the penetration of earth between coulters and depth control wheel in an optimised manner.

It has been conceived in particular that the two discs forming a double disc coulter are arranged at a different angle of inclination to one another and/or to the direction of travel, i.e. the inner drill discs are arranged at a smaller angle than the outer discs.

A preferred embodiment provides here that the inner discs of the respective double disc coulters are arranged approximately parallel to the rotation plane of the depth control wheel, in order to prevent a disruptive discharge of earth in the area of the depth control wheel.

A multifunctional implement in the form of a cylinder or roller is positioned between the fertiliser coulter and the seed drill designed as a double disc coulter, which in a first function aligned as it were to the front catches to a great extent the discharge of the fertiliser coulter from, the fertiliser furrow and compresses this, again above the fertiliser belt or closes the fertiliser coulter slit again.

In a second function this implement serves to recompact the earth in front of the double disc coulter and is thus to an extent designed to have an effect to the rear. The cylinder or roller acts as a precompacting tool for the double disc coulter positioned behind this and thus to the seed furrow. The cylinder thus fulfils an advantageous double function with regard to postcompaction for the upstream fertiliser coulter and the precompaction of the downstream double disc coulter.

Finally, where necessary the implement may have a third important function, if the implement is designed as a depth guide device for the precision seed drill. In this third function, the implement serves at the time as depth guide for the precision seed drill and thus replaces the function of separate frame guide wheels, which can now be done without.

In supplement it is planned that the implement as a cylinder is fitted with a number of parallel rings projecting over the circumference of the cylinder or forming the outer circumference of the cylinder. For the purpose of postcompaction for the fertiliser coulter and precompaction for the double disc coulter it is recommended that the cylinder is fitted with a number of parallel rings, preferably with two rings, which correspond in their arrangement and design with the fertiliser or seed furrow and insofar influence and guarantee the multiple function implement significantly.

A ring of this type tapers expediently to the outside in the form of a roof. To enhance the described effects it is provided that the rings have several floor drive elements, preferably wedges, distributed around their circumference and stretching in its axial direction. Twelve of the wedges are distributed evenly on both sides per ring. These wedges strengthen and optimise the functions in the frame of the postcompaction and precompaction. With regard to the shape of the wedges the idea is that the wedges are designed as a trapezoid that stretches over the complete depth of the rings on the cylinder. The longer base side of the trapezoid therefore coincides with the inside edge of the ring, or with the transition ring/cylinder, the shorter base side of the trapezoid with the tapering outside edge of the ring.

A further advantageous embodiment of the invention provides that the cylinder has two part cylinders spaced centrally from one another or a central recess into which the fertiliser coulters project at least with their rear end. That is, two part cylinders or the central recess in the cylinder are positioned and dimensioned so that the fertiliser coulters arranged in pairs and the recess in the cylinder engage with one another. This leads to a certain cleaning effect or to prevention of soil deposits in this area. In supplement to this, it is provided that the cylinder has a ring on both sides adjacent to its central recess, and the part cylinder has a ring on its inside. Seen from the outside to the inside, this implement is therefore structured so that on the outside there is a normal cylinder cross-section to which a ring connects and then on the inside a recess.

An additional embodiment of the invention provides that the cylinder is followed by an arrangement of preferably two double disc coulters, whereby the part of the double disc coulters that is effective in the soil has about the same mean spacing in a lateral direction as the mean spacing of the rings.

For the supplementary arrangement of a seeding heart it is provided that a seeding heart is allocated in each case to one row unit with two double disc coulters, preferably that a joint seeding heart is allocated in each case to a pair of double disc coulters. In order to be able in particular to plant the seed in the ground individually and evenly spaced it is recommended that the separating device is formed by a pair of separating plates joined to one another at their outer edge, which are arranged offset to one another in a tangential direction to generate a spread seed row and are allocated to separate outlets to discharge the seed from the seeding heart in the direction of the sowing coulter. A spread seed row can be explained in that, along with practically even longitudinal spacing, seeds placed down in this row have a defined lateral clearance from the middle of the row alternating right and left.

If the central spacing of the outlets and/or the pipes connected to them corresponds at least approximately to the lateral spacing of the spread seed row, the seed is led preferably vertically downwards and without, any appreciable collisions with the inner wall of the outlet or pipe into the area of the seed placement. The change in the direction of the seed inside the discharge pipe is reduced to a minimum and prevents unnecessary collision delays during seed transport, which at the same time considerably increases the placing accuracy within the seed row.

The invention is characterised in particular in that a coulter arrangement is created for a machine used in agriculture, specifically for a pneumatic precision seed drill, with which the unwanted penetration of soil into the assembly consisting of double disc coulters and depth control wheel can be ruled out to the greatest extent. Thanks to the positioning of the depth control wheel between the two disc coulters seen from the direction of travel, and this arrangement of the axle of the double disc coulters within the circumference of the depth control wheel—or vice versa—there is synchronisation between the coulters and the depth control wheel in the same direction and there is no more penetration of soil in this area because of the construction.

Further details and advantages of the object of the invention can be found in the following description of the associated drawing, which shows a preferred design example with the necessary details and individual parts.

Figure 2:
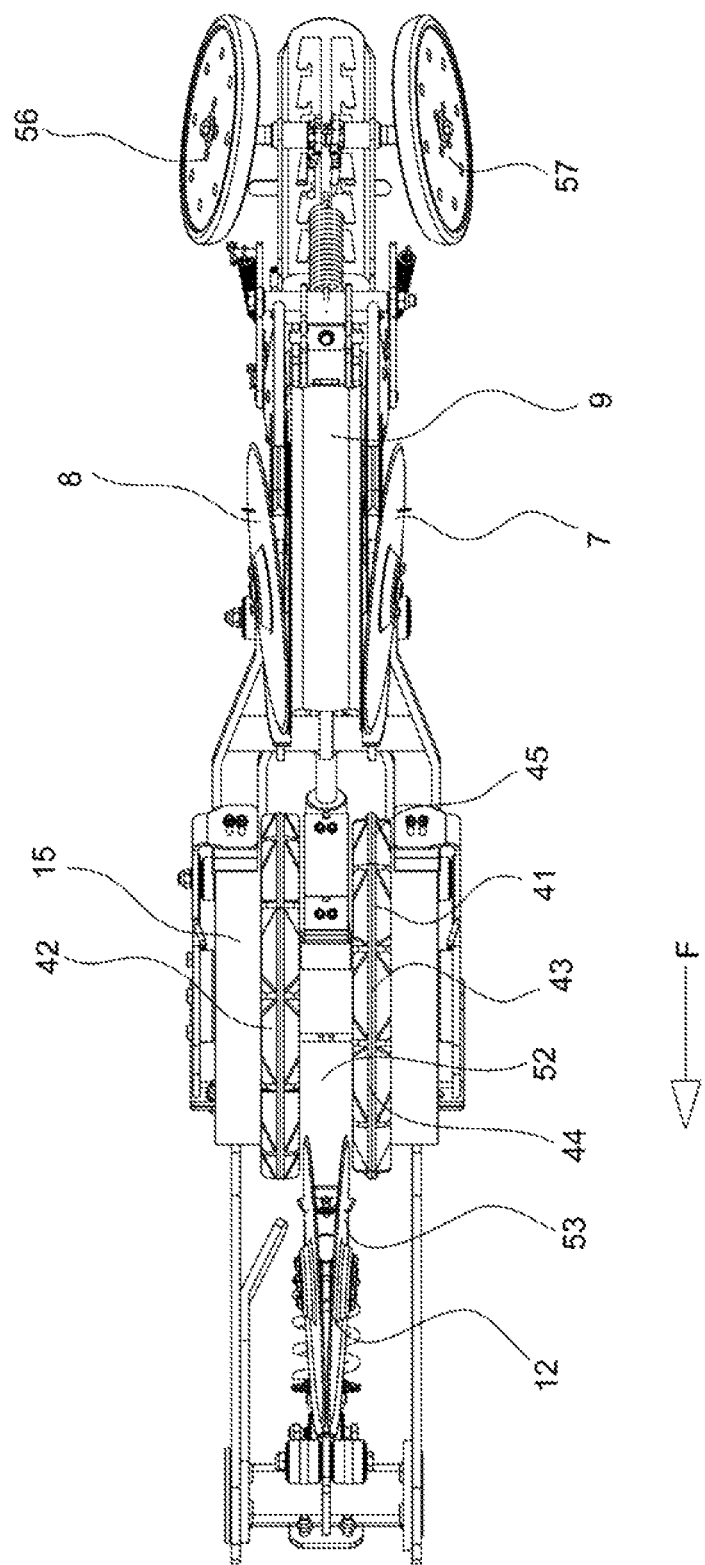
Figure 3:
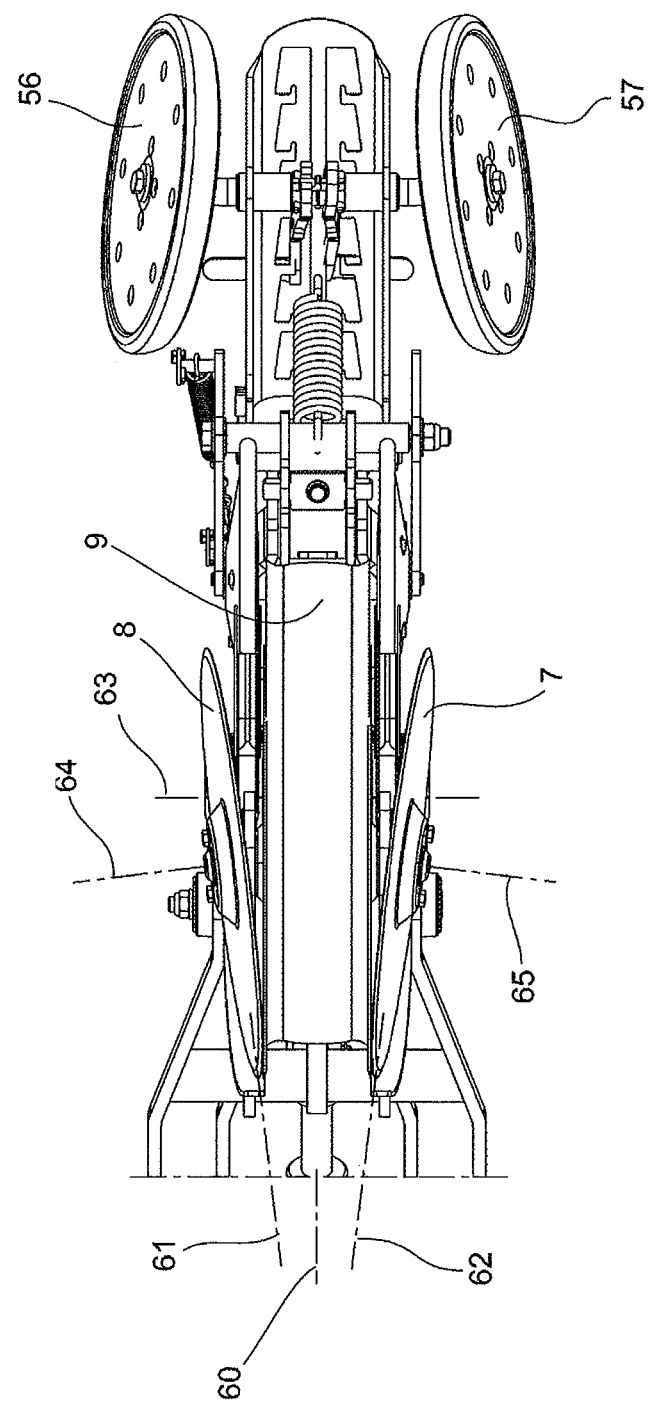
Figure 4:
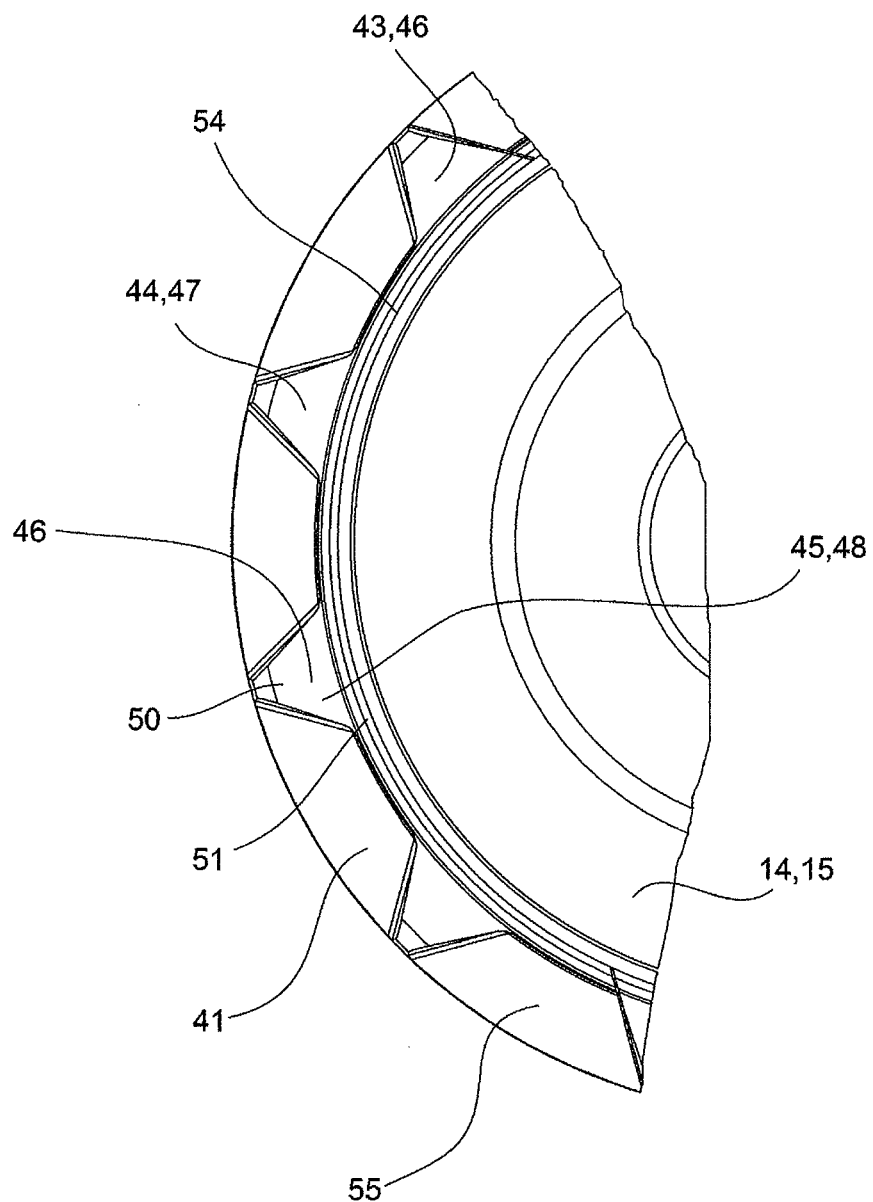
Figure 5:
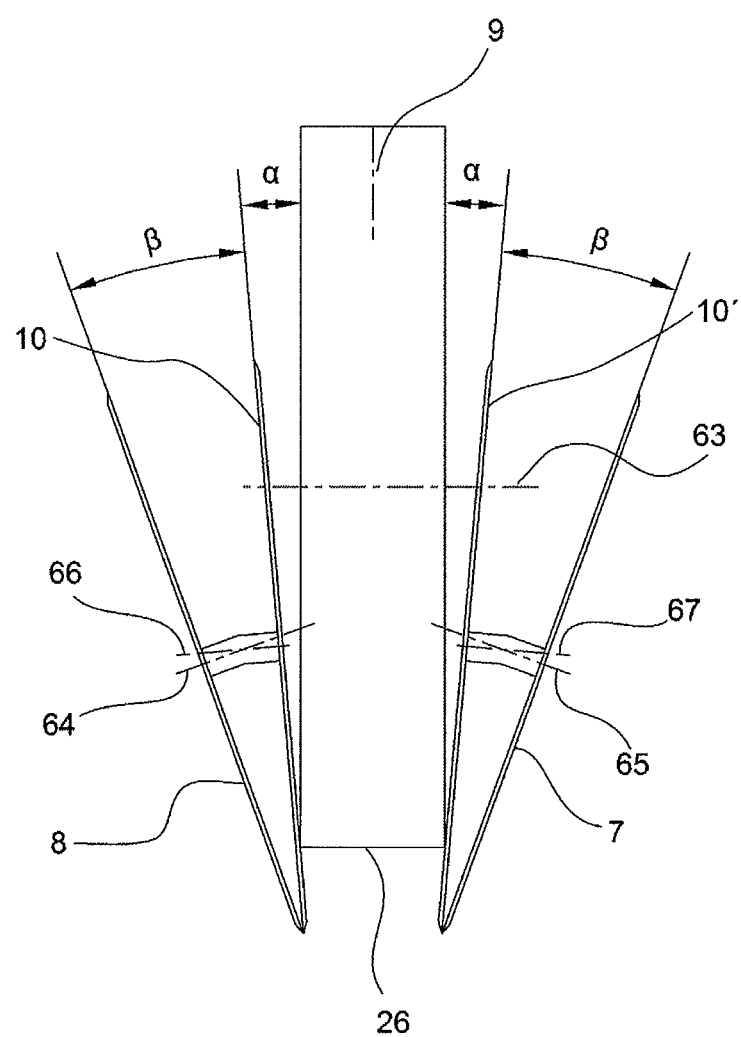

FIG. 1 shows a segment of a seed drill with the special units for the invention in a side view, FIG. 2 shows a view of the units from below, FIG. 3 shows a section of FIG. 2, FIG. 4 shows a section of FIG. 1 and FIG. 5 shows a preferred coulter arrangement.

FIG. 1 shows a side view of the units that are important for the invention in the form of the sowing coulter supported on the coulter arm 40 and designed as a double disc coulter 7, which pivots around the axle 36 and the depth control wheel 9 that is arranged practically level. In front of this unit consisting of double disc coulters 7, 8 and the depth control wheel 9 the implement 14 designed as cylinder on frame 6 can be seen, and behind this the pressure roller 57.

In FIG. 2, this ensemble is shown from below with an indication of the direction of travel F, including with a view of the transition between fertiliser coulter 12 and cylinder 15. The latter has a central recess 52 that serves to hold the rearward end 53 of the fertiliser coulters 12, in order to guarantee a mutual cleaning effect and to exclude accumulations of soil as far as possible here as well. A ring 41, 42 is attached to the recess 52 on both sides. Seen from these rings 41, 42 to the outside, the "actual" cylinder 15 is attached with a reduced diameter in comparison to the rings 41, 42. The double disc coulters 7, 8 with the depth control wheel 9 positioned between them are located in the rear area of this arrangement. The pressure rollers are numbered 56 and 57 as the final tool.

This appliance section is shown even better in FIG. 3. The two double disc coulters 7 and 8 are positioned in the direction of travel slanting forwards, the axles 64, 65 of the double disc coulters 7, 8 and the axle 63 of the depth control wheel 9 are positioned correspondingly. The angle at which the double disc coulters 7, 8 are arranged corresponds as well to that of the longitudinal axis 60 of the appliance section to the two longitudinal axes 61 and 62 of the double disc coulters 7 and 8.

An enlarged representation of cylinder, rings and wedges is found in FIG. 4. The tapered ring 41 with a number of wedges marked here as 43, 44 and 45 as examples covers the actual circumference 64 of the cylinder 14. A trapezoid 48 of this kind tapers outwards from its longer base side/inner edge 51 to its shorter base side/outer edge 50, which itself is coincidental with the outer edge 55 of the ring 41.

Finally, FIG. 5 shows a further coulter arrangement shown schematically from below as in FIG. 3, in which the depth control wheel 9 and the two double disc coulters 7, 8, more precisely their two inside coulters 10, 10' are in contact at the front end 26 of the depth control wheel 9, so that mutual drive is possible through the same direction of rotation. An angle position provides for a clearance angle α between depth control wheel and double disc coulter of only 0.5° to 5.0°, which corresponds to the angle of the bearing axles 66, 67 of the inner disc coulters to the axle 63 of the depth control wheel. The clearance angle plane that is generated through the angle α, can run both horizontally, as shown, and vertically. In this, the straight lines, which generate the angle α in their point of intersection, show preferably to the front or downwards. Even more suitable is an alignment in the direction of travel at an angle downwards. The alignment of the bearing axles 64 to 66 and 65 to 67 corresponds to the opening angle β of the respective double disc coulter 7, 8.

The invention claimed is:

1. Arrangement of coulters on a frame of an agricultural machine, comprising an arrangement of two double disc coulters (7, 8) and a depth control wheel (9) on a frame (6) of a pneumatic precision seed drill, characterised in that the depth control wheel (9) seen from the direction of travel is located between the two double disc coulters (7, 8), whereby the two double disc coulters (7, 8) and the depth control wheel (9) rotate in the same direction and the depth control wheel (9) and the two adjacent double disc coulters (7, 8) are arranged or designed to be in contact with each other at least approximately, whereby the depth control wheel (9) and inner coulters (10) of the two adjacent double disc coulters (7, 8) are arranged or designed to be in contact with each other at least approximately at the front end (26) of the depth control wheel (9).

2. Arrangement in accordance with claim 1, characterised in that a clearance angle ($\alpha$) between the depth control wheel (9) and the double disc coulter (7, 8) is 0.5°, to 5.0°.

3. Arrangement in accordance with claim 1, characterised in that seen from the direction of travel an axle (36) of the double disc coulters (7, 8) and an axle (37) of the depth control wheel (9) are at least approximately level.

4. Arrangement in accordance with claim 1, characterised in that the axle (36) of the double disc coulter pairs (7, 8) lies inside the circumference of the depth control wheel (9).

5. Arrangement in accordance with claim 1, characterised in that the axle (37) of the double control wheel (9) lies inside the circumference of the double disc coulter pairs (7, 8).

6. Arrangement in accordance with claim 1, characterised in that the double disc coulter pairs (7, 8) are arranged diagonally to the direction of travel.

7. Arrangement in accordance with claim 6, characterised in that the two discs forming a double disc coulter (7, 8) are arranged in a different angle of inclination to one another and/or to the direction of travel.

8. Arrangement in accordance with claim 6, characterised in that the inner coulters of the respective double disc coulters (7,8) are arranged approximately parallel to a rotation level of the depth control wheel (9).

9. Arrangement in accordance with claim 1, characterised in that an implement (14) shaped as a cylinder (15) or roller is arranged between a fertiliser coulter (12) and the double disc coulter (7, 8) that is designed to close a fertiliser coulter slot and for postcompaction of the earth thrown up by the fertiliser coulter (12).

10. Arrangement in accordance with claim 9, characterised in that the implement (14) is designed for precompaction of soil in front of the double disc coulter (7, 8).

11. Arrangement in accordance with claim 9, characterised in that the implement (14) is designed as a depth guide device for the precision seed drill.

12. Arrangement in accordance with claim 9, characterised in that the implement (14) as cylinder (15) is fitted with a number of parallel rings (41, 42) projecting over the circumference (54) of the cylinder (15).

13. Arrangement in accordance with claim 12, characterised in that the rings (41, 42) have several floor drive, wedges (43, 44, 45), distributed over their circumference and stretching in their axial direction, which are designed as trapezoids (46, 47, 48) that stretch over the full depth of rings (41, 42).

14. Arrangement in accordance with claim 9, characterised in that the cylinder (15) the cylinder (15) two centrally spaced part cylinders or a central recess (52), into whose area the fertiliser coulters (12) project at least with their rearward end (53).

15. Arrangement in accordance with claim 9, characterised in that the cylinder (15) follows an arrangement of two double disc coulters (7, 8), whereby the area of the double disc coulters (7, 8) that is effective in the soil has about the same mean spacing to the side as the mean spacing of the rings (41, 42).

16. Arrangement in accordance with claim 1 characterised in that a joint seeding heart is allocated in each case to a pair of double disc coulters (7, 8).

17. Arrangement in accordance with claim 1 characterised in that a joint seeding heart is allocated in each case to a pair of double disc coulters (7, 8).

18. Arrangement in accordance with claim 1, characterised in that middle spacing of the outlets and/or of the pipes corresponds at least approximately to the lateral clearance of a spread seed furrow.

* * * * *